United States Patent
Huang et al.

(10) Patent No.: US 10,264,600 B2
(45) Date of Patent: Apr. 16, 2019

(54) VIRTUAL CLUSTER GROUP BASED UPLINK CONTROL CHANNEL

(71) Applicant: QUALCOMM Incorporated, San Diego, CA (US)

(72) Inventors: Yi Huang, San Diego, CA (US); Tao Luo, San Diego, CA (US); Krishna Kiran Mukkavilli, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/411,904

(22) Filed: Jan. 20, 2017

(65) Prior Publication Data

US 2017/0367113 A1 Dec. 21, 2017

Related U.S. Application Data

(60) Provisional application No. 62/350,667, filed on Jun. 15, 2016.

(51) Int. Cl.
*H04B 7/00* (2006.01)
*H04W 72/12* (2009.01)
(Continued)

(52) U.S. Cl.
CPC ....... *H04W 72/1284* (2013.01); *H04L 5/0039* (2013.01); *H04L 5/0041* (2013.01); *H04L 5/0053* (2013.01); *H04W 72/0413* (2013.01)

(58) Field of Classification Search
CPC ............... H04W 72/12; H04W 72/121; H04W 72/1263; H04W 72/1268
(Continued)

(56) References Cited

U.S. PATENT DOCUMENTS

| 7,613,242 | B2 * | 11/2009 | Bykovnikov | H04L 5/023 375/260 |
| 7,974,176 | B2 * | 7/2011 | Zheng | H04B 1/707 370/203 |

(Continued)

FOREIGN PATENT DOCUMENTS

EP    2262337 A1    12/2010

OTHER PUBLICATIONS

CATT: "PUCCH Resource Allocation for TDD eIMTA", 3GPP TSG RAN WG1 Meeting #75, R1-135059, Nov. 13, 2013, XP050734762, Retrieved from the Internet: URL:http://www.3gpp.org/ftp/Meetings_3GPP_SYNC/RAN/RAN1/Docs/, 4 pages.

(Continued)

*Primary Examiner* — Dmitry Levitan
(74) *Attorney, Agent, or Firm* — Loza & Loza, LLP

(57) ABSTRACT

Aspects of the present disclosure provide a scheduling entity in communication with a set of scheduled entities within a wireless communication network. The scheduling entity groups a plurality of tones into uplink clusters, where each uplink cluster includes one or more adjacent tones. In addition, the scheduling entity maps a first set of uplink clusters to a first virtual cluster group (VCG) for an uplink control channel, assigns the first VCG to a first scheduled entity of the set of one or more scheduled entities, provides a first VCG index identifying the first VCG to the first scheduled entity and receives uplink control information from the first scheduled entity on the first VCG over the uplink control channel.

37 Claims, 13 Drawing Sheets

(51) Int. Cl.
*H04W 72/04* (2009.01)
*H04L 5/00* (2006.01)

(58) Field of Classification Search
USPC .................. 370/310, 328, 329, 436, 458
See application file for complete search history.

(56) References Cited

U.S. PATENT DOCUMENTS

| | | | |
|---|---|---|---|
| 8,483,149 B2* | 7/2013 | Tiirola | H04L 5/0053 370/329 |
| 8,483,158 B2* | 7/2013 | Lin | H04W 28/04 370/329 |
| 9,402,247 B2* | 7/2016 | Bala | H04L 5/001 |
| 9,426,785 B2* | 8/2016 | Piipponen | H04W 72/04 |
| 9,531,515 B2* | 12/2016 | Pajukoski | H04L 5/001 |
| 9,622,230 B2* | 4/2017 | Chen | H04W 72/042 |
| 9,722,735 B2* | 8/2017 | Shin | H04L 1/0028 |
| 2011/0085516 A1 | 4/2011 | Pajukoski et al. | |
| 2013/0322363 A1 | 12/2013 | Chen et al. | |
| 2015/0085794 A1* | 3/2015 | Chen | H04B 7/0413 370/329 |

OTHER PUBLICATIONS

International Search Report and Written Opinion—PCT/US2017/034781—ISA/EPO—dated Aug. 22, 2017 (163682WO).
Nishio A., et al., "System Evaluation of MU-MIMO and Multi-cluster Allocation in LTE-Advanced Uplink", IEEE 75th Vehicular Technology Conference (VTC Spring), 2012, pp. 1-5.

* cited by examiner

VIRTUAL CLUSTER GROUP BASED UPLINK CONTROL CHANNEL

PRIORITY CLAIM

This application claims priority to and the benefit of Provisional Patent Application No. 62/350,667 filed in the U.S. Patent and Trademark Office on Jun. 15, 2016, the entire content of which is incorporated herein by reference as if fully set forth below in its entirety and for all applicable purposes.

TECHNICAL FIELD

The technology discussed below relates generally to wireless communication systems, and more particularly, to uplink control information reporting in wireless communication systems.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

The spectrum allocated to such wireless communication networks is typically apportioned between downlink transmissions from the base station to user equipment and uplink transmissions from the user equipment to the base station. However, in next generation (5G) networks, flexibility in bandwidth allocation may be needed to meet the stringent data speed and latency requirements.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for efficiently allocating time-frequency resources on an uplink control channel to provide time and frequency diversity. The uplink control channel may be transmitted over predefined virtual cluster groups (VCGs), where each VCG includes a set of uplink clusters that are each mapped to specific adjacent physical tones (frequencies) of the system bandwidth. Each VCG may further be assigned to a particular scheduled entity and utilized by the scheduled entity to transmit uplink control information to the scheduling entity.

In one aspect, a method of communicating between a scheduling entity and a set of one or more scheduled entities in a wireless communication network is disclosed. The method includes mapping a first set of uplink clusters of a plurality of uplink clusters to a first virtual cluster group (VCG) for an uplink control channel, where each of the plurality of uplink clusters includes one or more respective adjacent tones of a plurality of tones and one or more symbols. The method further includes assigning the first VCG to a first scheduled entity of the set of one or more scheduled entities for use in transmitting uplink control information, transmitting a first VCG index identifying the first VCG to the first scheduled entity, and receiving the uplink control information from the first scheduled entity on the first VCG over the uplink control channel.

Another aspect of the disclosure provides a scheduling entity in a wireless communication network. The scheduling entity includes a transceiver for wireless communication with a scheduled entity, a memory, and a processor communicatively coupled to the transceiver and the memory. The processor is configured to map a first set of uplink clusters of a plurality of uplink clusters to a first virtual cluster group (VCG) for an uplink control channel, where each of the plurality of uplink clusters includes one or more respective adjacent tones of a plurality of tones. The processor is further configured to assign the first VCG to a first scheduled entity of the set of one or more scheduled entities for use in transmitting uplink control information, transmit a first VCG index identifying the first VCG to the first scheduled entity, and receive the uplink control information from the first scheduled entity on the first VCG over the uplink control channel.

Another aspect of the disclosure provides a scheduling entity apparatus in a wireless communication network. The scheduling entity apparatus includes means for mapping a first set of uplink clusters of a plurality of uplink clusters to a first virtual cluster group (VCG) for an uplink control channel, where each of the plurality of uplink clusters includes one or more respective adjacent tones of a plurality of tones. The scheduling entity apparatus further includes means for assigning the first VCG to a first scheduled entity of a set of one or more scheduled entities for use in transmitting uplink control information, means for transmitting a first VCG index identifying the first VCG to the first scheduled entity, and means for receiving the uplink control information from the first scheduled entity on the first VCG over the uplink control channel.

Examples of additional aspects of the disclosure follow. In some aspects of the disclosure, the method further includes assigning a number of symbols to each of the uplink clusters, where the number of symbols in each uplink cluster within the first set of uplink clusters is identical. For example, the number of symbols in each uplink cluster may be one or greater than one. In some aspects of the disclosure, the adjacent tones included in at least one uplink cluster of the first set of uplink clusters varies between each symbol in the number of symbols. In some aspects of the disclosure, the symbols are non-consecutive in time across one or more slots, and the slots may be consecutive or non-consecutive in time.

In some aspects of the disclosure, the method further includes mapping the first set of uplink clusters across a first bandwidth to the first VCG, where the first bandwidth corresponding to a first device bandwidth supported by the first scheduled entity. In some aspects of the disclosure, the method further includes mapping a second set of uplink clusters across the first bandwidth to a second VCG for the uplink control channel, where the second VCG is identified by a second VCG index, and the adjacent tones within the first set of uplink clusters and the second set of uplink clusters are non-overlapping. The method may then further include assigning the second set of uplink clusters to a second scheduled entity of the set of one or more scheduled entities, and transmitting the second VCG index of the second VCG to the second scheduled entity, where the first VCG and the second VCG are included within a first VCG set associated with the first bandwidth.

In some aspects of the disclosure, the method further includes mapping a third set of uplink clusters across a second bandwidth to a third VCG for the uplink control channel, where the third VCG is identified by a third VCG index. The method may then further include assigning the third set of uplink clusters to a third scheduled entity of the set of one or more scheduled entities, where the second bandwidth corresponds to a second device bandwidth supported by the third scheduled entity, and the first bandwidth is different than the second bandwidth, and transmitting the third VCG index of the third VCG to the third scheduled entity, where the third VCG is included within a second VCG set associated with the second bandwidth. In some aspects of the disclosure, the adjacent tones within the first set of uplink clusters, the second set of uplink clusters and the third set of uplink clusters are non-overlapping. In some aspects of the disclosure, the method further includes mapping the third set of uplink clusters to a second symbol in the time domain. In some aspects of the disclosure, the adjacent tones within the first set of uplink clusters at least partially overlap with the adjacent tones within the third set of uplink clusters.

In some aspects of the disclosure, each tone of the plurality of tones is included within only one of the uplink clusters. In some aspects of the disclosure, the uplink clusters of the first set of uplink clusters are non-adjacent in frequency. In some aspects of the disclosure, each uplink cluster within the first set of uplink clusters includes one or more of pilot tones and uplink control channel payload tones. In some aspects of the disclosure, the uplink control information from the first scheduled entity is located on the adjacent tones within the first VCG within each symbol assigned to the first VCG.

In some aspects of the disclosure, the method further includes establishing a connection with the first scheduled entity, where mapping the first set of uplink clusters to the first VCG occurs prior to establishing the connection with the first scheduled entity, and where assigning the first VCG to the first scheduled entity occurs after establishing the connection with the first scheduled entity.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
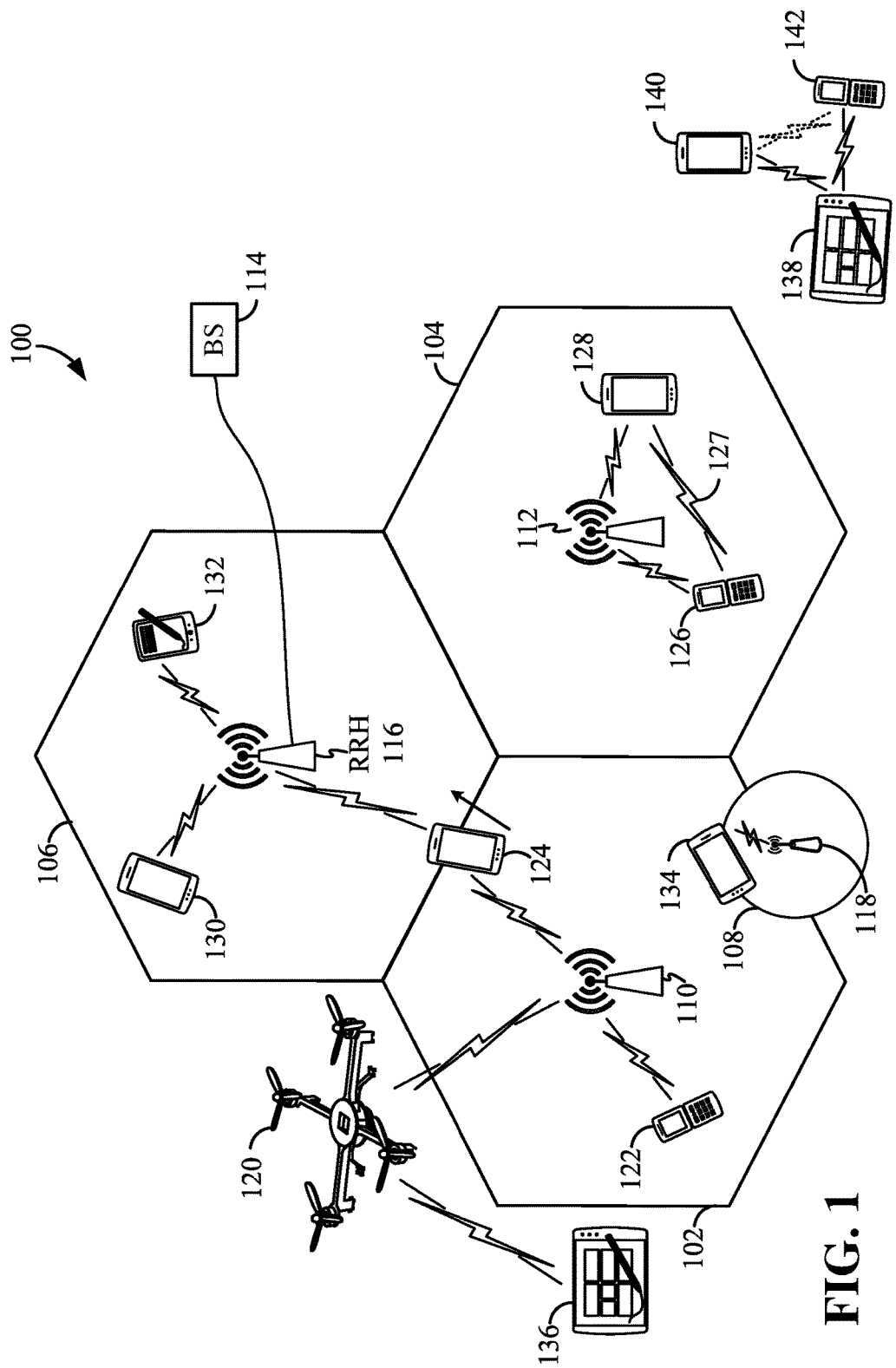
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The access network 100 may be a next generation (e.g., fifth generation (5G)) access network or a legacy (3G or 4G) access network. In addition, one or more nodes in the access network 100 may be next generation nodes or legacy nodes.

As used herein, the term legacy access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT- 2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network generally refers to a network employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum and Korea Telecom SIG.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or user data traffic from a base station (e.g., base station 110) to one or more UEs (e.g., UEs 122 and 124) may be referred to as downlink (DL) transmission, while transmissions of control information and/or user data traffic originating at a UE (e.g., UE 122) may be referred to as uplink (UL) transmissions. In addition, the uplink and/or downlink control information and/or user data traffic may be transmitted in slots, which may each include a certain number of symbols of variable duration. For example, the symbol duration may vary based on the cyclic prefix (e.g., normal or extended) and the numerology (e.g., sub-carrier spacing) of the symbol. In some examples, a slot may include one or more mini-slots, which may refer to an encapsulated set of information capable of being independently decoded. One or more slots may be grouped together into a subframe. In addition, multiple slots or subframes may be grouped together to form a single frame or radio frame. Any suitable number of slots or subframes may occupy a frame. In addition, a slot or subframe may have any suitable duration (e.g., 250 μs, 500 μs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
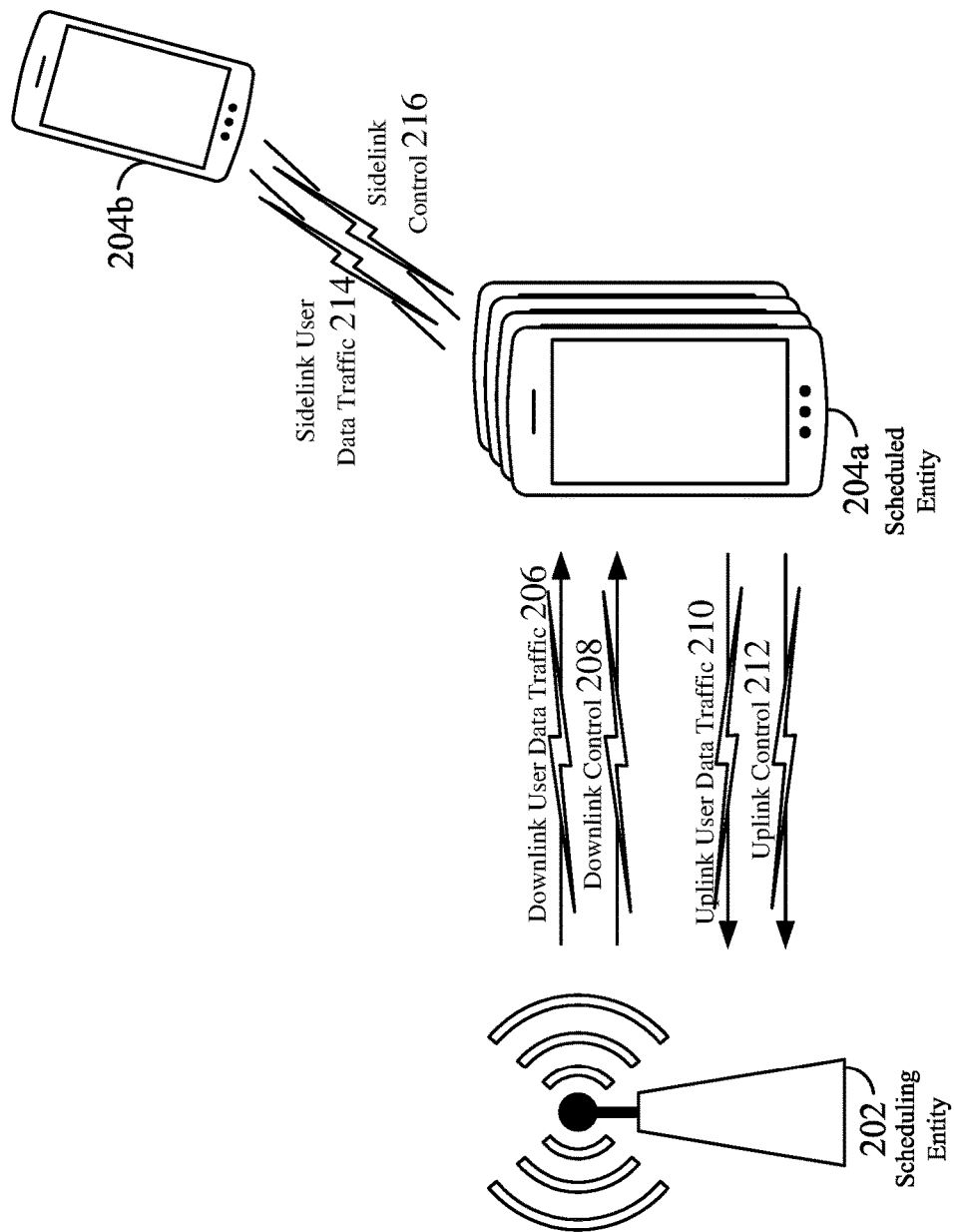
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast user data traffic 206 to one or more scheduled entities 204 (the data may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control information and user data traffic may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink user data traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink data 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS signals (e.g., handshake) may enable different scheduled entities performing sidelink communications to negotiate the availability of the sidelink channel prior to communication of the sidelink data information (traffic) 214. The PSHICH may include HARQ acknowledgment information and/or a HARQ indicator from a destination device, so that the destination may acknowledge data received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other user data traffic, control, and feedback channels.

In addition, in next generation (5G) networks, due to the limited spectrum available for uplink control signaling, time-frequency resources may be efficiently allocated on the uplink control channel to provide time and frequency diversity. In various aspects of the disclosure, the uplink control channel may be transmitted over predefined virtual cluster groups (VCGs), where each VCG includes uplink clusters that are mapped to specific physical tones (frequencies) of the system bandwidth. Each VCG may further be assigned to a particular scheduled entity and utilized by the scheduled entity to transmit uplink control information to the scheduling entity. For example, within a particular device bandwidth supported by a scheduled entity, the tones/frequencies available for uplink control information may be grouped into uplink clusters such that each uplink cluster includes one or more adjacent tones. A set of uplink clusters may then be mapped to a VCG and assigned to the scheduled entity for use in transmitting uplink control information over, for example, the PUCCH. In some examples, the VCG mapping is performed to prevent collisions between scheduled entities. Thus, the tones may be mapped to VCGs to ensure that there is no tone overlap between the VCGs during each symbol (e.g., Orthogonal Frequency Division Multiplexing (OFDM) symbol), slot or other suitable time period.

Figure 3:
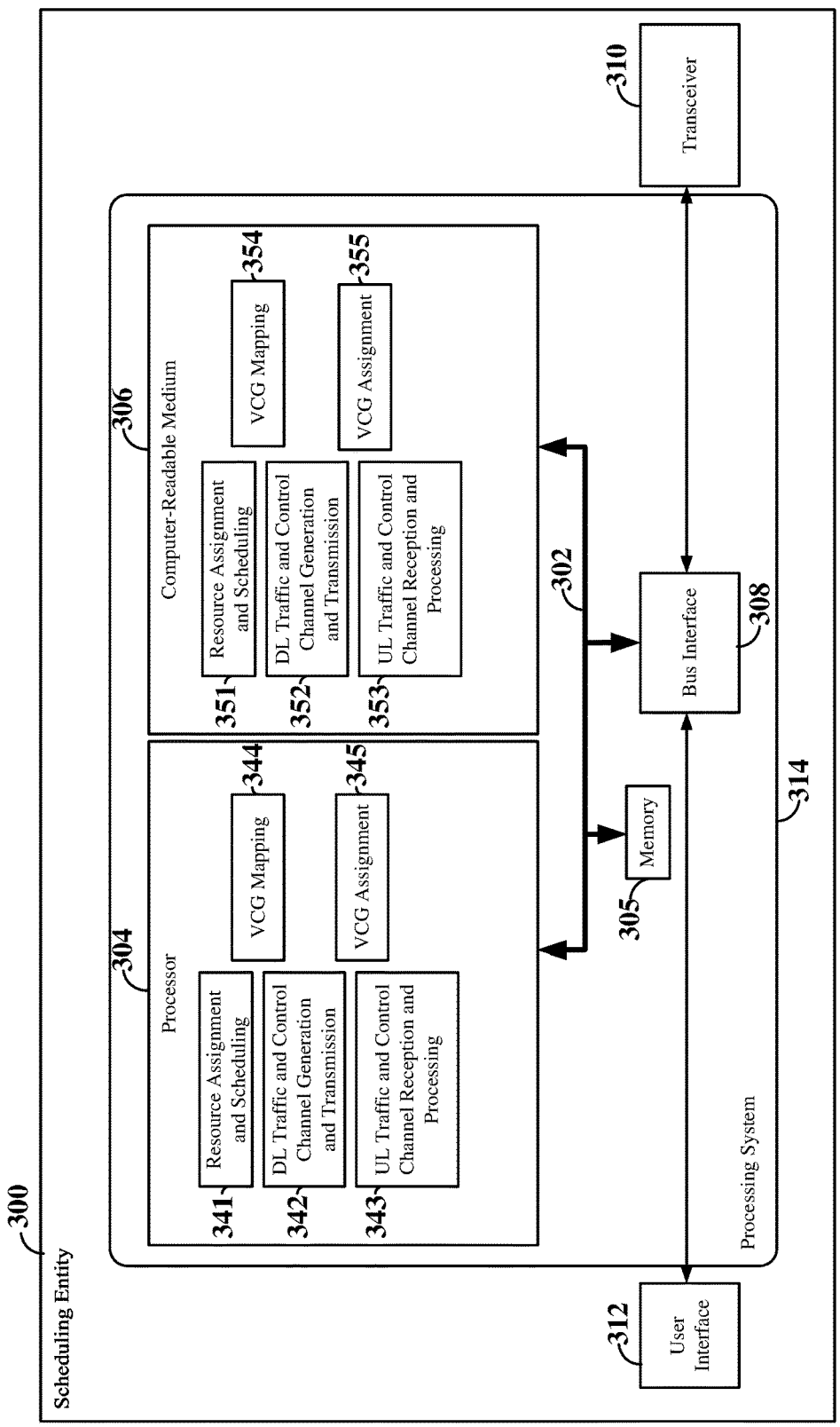
FIG. 3 is a block diagram illustrating an example of a hardware implementation for a scheduling entity employing a processing system according to some embodiments.

FIG. 3 is a conceptual diagram illustrating an example of a hardware implementation for an exemplary scheduling entity 300 employing a processing system 314. For example, the scheduling entity 300 may be a user equipment (UE) as illustrated in any one or more of FIGS. 1 and 2. In another example, the scheduling entity 300 may be a base station as illustrated in any one or more of FIGS. 1 and 2. For example, the scheduling entity 300 may be a next generation (5G) scheduling entity serving a macro or small cell.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 304 may include circuitry configured for various functions. For example, the processor 304 may include resource assignment and scheduling circuitry 341, configured to generate, schedule, and modify a resource assignment or grant of time-frequency resources. For example, the resource assignment and scheduling circuitry 341 may generate one or more time division duplex (TDD) and/or frequency division duplex (FDD) subframes or slots, each including time-frequency resources assigned to carry user data traffic and/or control information to and/or from multiple scheduled entities. The resource assignment and scheduling circuitry 341 may operate in coordination with resource assignment and scheduling software 351.

The processor 304 may further include downlink (DL) traffic and control channel generation and transmission circuitry 342, configured to generate and transmit downlink user data traffic and control channels. For example, the DL traffic and control channel generation and transmission circuitry 342 may be configured to generate master information blocks (MIBs), system information blocks (SIBs), radio resource control (RRC) connection or configuration messages, random access message, and various control channels, such as a PBCH, a PSS, a SSS, a physical control format indicator channel (PCFICH), a physical hybrid automatic repeat request (HARQ) indicator channel (PHICH), and/or a physical downlink control channel (PDCCH). In addition, the DL traffic and control channel generation and transmission circuitry 342 may operate in coordination with the resource assignment and scheduling circuitry 341 to schedule the DL user data traffic and/or control information and to place the DL user data traffic and/or control information onto a time division duplex (TDD) or frequency division duplex (FDD) carrier within one or more slots in accordance with the resources assigned to the DL user data traffic and/or control information. The DL traffic and control channel generation and transmission circuitry 342 may further operate in coordination with DL traffic and control channel generation and transmission software 352.

The processor 304 may further include uplink (UL) traffic and control channel reception and processing circuitry 343, configured to receive and process uplink control channels and uplink user data traffic channels from one or more scheduled entities. In some examples, the UL traffic and control channel reception and processing circuitry 343 may be configured to receive scheduling requests from one or more scheduled entities, the scheduling requests being configured to request a grant of time-frequency resources for uplink user data traffic transmissions. In other examples, the UL traffic and control channel reception and processing circuitry 343 may be configured to receive and process acknowledgement information (e.g., acknowledged/not acknowledged packets) from one or more scheduled entities. The UL traffic and control channel reception and processing circuitry 343 may further be configured to receive a random access message and/or RRC connection request message from a scheduled entity and to process the random access message and/or RRC message to establish a connection with the scheduled entity. The UL traffic and control channel reception and processing circuitry 343 may further operate in coordination with the resource assignment and scheduling circuitry 341 to schedule UL user data traffic transmissions, DL user data traffic transmissions and/or DL user data traffic retransmissions in accordance with other received UL control channel information. The UL traffic and control channel reception and processing circuitry 343 may further operate in coordination with UL traffic and control channel reception and processing software 353.

The processor 304 may further include virtual cluster group (VCG) mapping circuitry 344, configured to define virtual cluster groups (VCGs), where each VCG includes one or more uplink clusters that are each mapped to specific physical tones (frequencies) of a particular bandwidth. For example, each uplink cluster may include one or more adjacent tones, and each tone within an uplink cluster may be a pilot tone or a PUCCH payload tone. In some examples, an uplink cluster includes both pilot tones and PUCCH payload tones. In an aspect of the disclosure, there is no tone overlap between uplink clusters. Thus, each tone/frequency may be mapped to only a single uplink cluster at a time.

In addition, each uplink cluster may further include a predetermined number of symbols (e.g., one or more OFDM symbols). The number of symbols may be determined, for example, based on the number of symbols needed for an uplink control message. For example, to transmit acknowledgement information (e.g., an ACK/NACK message), only one symbol may be needed. However, other types of control information (e.g., scheduling requests, channel quality information, etc.) may require two or more symbols. The number of symbols is variable and can include any number of symbols up to a maximum number of symbols allowed for an uplink control message. In some examples, the tones included within the uplink cluster may vary between symbols. As an example, for a first symbol, an uplink cluster may include tones 1-4, while for a second symbol, the same uplink cluster may include tones 5-8. The symbols of an uplink cluster may be transmitted within a single slot or across multiple slots, which may be consecutive or non-consecutive. Furthermore, the symbols of an uplink cluster may be consecutive or non-consecutive within the slot or across slots.

The VCG mapping circuitry 344 may further be configured to map a set of uplink clusters, each having the same number of symbols, to a VCG. In some examples, two or more of the uplink clusters within a VCG may be separated in frequency from one another. For example, one or more intervening tones/frequencies may separate two sequential (in tone/frequency) uplink clusters within the VCG. The number of uplink clusters within a VCG is configurable and may be determined, for example, based on the bandwidth needed for an uplink control message or the number/type of uplink control messages to be transmitted. The VCG mapping circuitry 344 may further assign a respective VCG index to each VCG group. The VCG index identifies the VCG and may be used by the scheduled entity to determine which tones/frequencies and slots/symbols on which control information may be transmitted.

The VCG mapping circuitry 344 may further be configured to group VCGs into VCG sets, where each VCG set is defined for a particular bandwidth. Each bandwidth may correspond, for example, to a device bandwidth supported by one or more scheduled entities served by the scheduling entity. Thus, for a first device bandwidth, a first VCG set may be defined that includes one or more VCGs, and for a second device bandwidth, a second VCG set may be defined that includes one or more other VCGs. In some examples, the VCGs within a VCG set each include the same number of uplink clusters, each having the same number of symbols. To provide flexibility in the number of clusters (tones) and/or symbols allocated to the scheduled entities for control information, more than one VCG set may be defined for each device bandwidth, and each VCG set may be identified by a VCG set identifier. In an aspect of the disclosure, the VCG sets can be defined to ensure that there is no tone overlap between VCG sets in the time domain to avoid collisions between scheduled entities in different VCG sets. The VCG mapping circuitry 344 may further operate in coordination with VCG mapping software 354.

The processor 304 may further include VCG assignment circuitry 345, configured to assign a VCG to a scheduled entity for use in transmitting uplink control information over, for example, the PUCCH. For example, the VCG assignment circuitry 345 may determine the device bandwidth supported by the scheduled entity and select a VCG within one of the VCG sets corresponding to the scheduled entity device bandwidth. In some examples, the VCGs and VCG sets are predefined (e.g., mapping of uplink clusters to VCGs and VCG sets occurs prior to synchronizing with a scheduled entity and establishing a connection with a scheduled entity). The VCG assignment circuitry 345 may further provide the assigned VCG index to the DL traffic and control channel generation and transmission circuitry 342 for transmission of the assigned VCG index to the scheduled entity.

The VCG index may be statically, semi-statically or dynamically transmitted to the scheduled entity. For example, when multiple VCG sets are defined for a device bandwidth, the VCG assignment circuitry 345 may dynamically assign a VCG to a scheduled entity based on the current/next slot structure, bandwidth allocated for control information within the current/next slot structure and/or type of control information expected to be transmitted by the scheduled entity. In this example, the VCG assignment circuitry 345 may further include a VCG set identifier with the VCG index. The VCG assignment circuitry 345 may operate in coordination with VCG assignment software 355.

Figure 4:
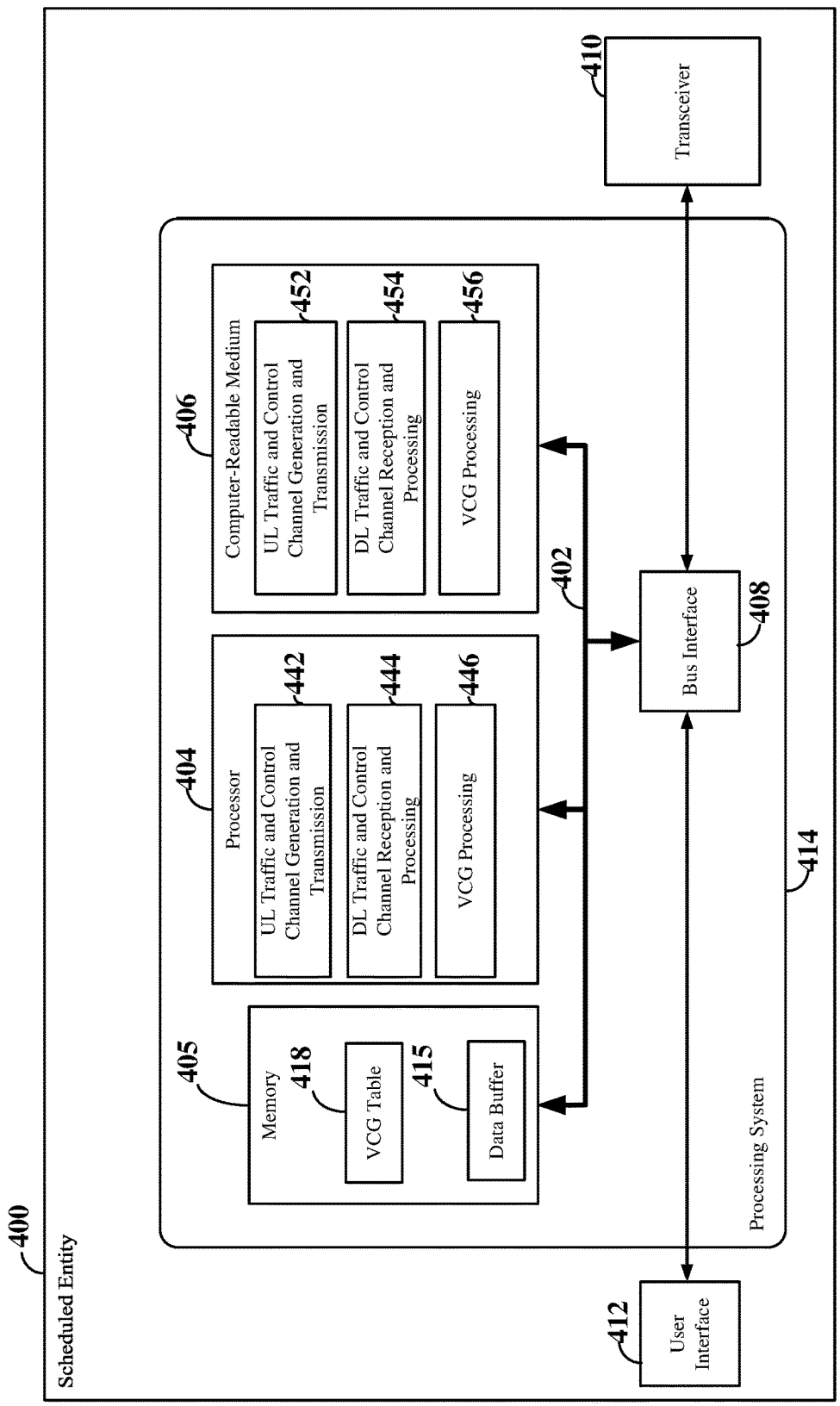
FIG. 4 is a block diagram illustrating an example of a hardware implementation for a scheduled entity employing a processing system according to some embodiments.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1 and 2.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. That is, the processor 404, as utilized in a scheduled entity 400, may be used to implement any one or more of the processes described below.

In some aspects of the disclosure, the processor 404 may include uplink (UL) traffic and control channel generation and transmission circuitry 442, configured to generate and transmit uplink user data traffic on an UL user data traffic channel, and to generate and transmit uplink control/feedback/acknowledgement information on an UL control channel. In some examples, the UL traffic and control channel generation and transmission circuitry 442 may further be configured to generate and transmit one or more random access messages and/or RRC connection setup messages to establish a connection with a scheduling entity. The UL traffic and control channel generation and transmission circuitry 442 may operate in coordination with UL traffic and control channel generation and transmission software 452.

The processor 404 may further include downlink (DL) traffic and control channel reception and processing circuitry 444, configured for receiving and processing downlink user data traffic on a downlink user data traffic channel (e.g., the PDSCH), and to receive and process control information on one or more downlink control channels (e.g., the PDCCH). In some examples, the DL traffic and control channel reception and processing circuitry 444 may be configured to receive and process one or more of a PSS or SSS to synchronize with the scheduling entity and to receive one or more random access messages and/or RRC connection setup messages from the scheduling entity to establish a connection with the scheduling entity. In some examples, received downlink user data traffic and/or control information may be temporarily stored in a data buffer 415 within memory 405. The DL traffic and control channel reception and processing circuitry 444 may operate in coordination with DL traffic and control channel reception and processing software 454.

The processor 404 may further include VCG processing circuitry 446, configured to receive a VCG index from the scheduling entity via the DL traffic and control channel reception and processing circuitry 444. The VCG index identifies a VCG assigned to the scheduled entity for use in transmitting UL control information to the scheduling entity. In some examples, the VCG processing circuitry 446 may determine the assigned VCG using only the VCG index. For example, if the scheduling entity has defined a single VCG set for the device bandwidth supported by the scheduled entity, the VCG processing circuitry 446 may determine that the received VCG index corresponds to the VCG set for the scheduled entity device bandwidth. In other examples, the VCG processing circuitry 446 may receive both a VCG set identifier and a VCG index from the scheduling entity and utilize both the VCG set identifier and VCG index to determine the VCG assigned to the scheduled entity. In some examples, the VCG index and VCG set identifier may be received after establishing a connection with the scheduling entity (e.g., using an RRC connection setup process).

In some examples, the VCG processing circuitry 446 may access a table 418 stored, for example, in memory 405 and index on the table 418 using the VCG index to determine the time-frequency resources (e.g., tones and number of symbols per tone) assigned to the corresponding VCG. Such VCG information (e.g., VCG indexes and corresponding time-frequency resources) may be received by the DL traffic and control channel reception and processing circuitry 444 within, for example, one or more Session Information Blocks (SIBs) after synchronization with the scheduling entity. The DL traffic and control channel reception and processing circuitry 444 may then store the VCG information within the memory 405 as VCG table 418 for later use by the VCG processing circuitry 446.

The VCG processing circuitry 446 may further provide the assigned VCG time-frequency resource information to the UL traffic and control channel generation and transmission circuitry 442 for use by the UL traffic and control channel generation and transmission circuitry 442 in transmitting UL control information to the scheduling entity. In some examples, the VCG time-frequency resource information may further specify the type of information to be transmitted inside each time-frequency resource (e.g., pilot information may be transmitted on pilot tones, while scheduling requests, ACK/NACKs and other control information may be transmitted on PUCCH payload tones). In other examples, the UL traffic and control channel generation and transmission circuitry 442 may utilize the assigned VCG time-frequency resource to send any type of control information, as needed. The VCG processing circuitry 446 may operate in coordination with VCG processing software 456.

Figure 5:
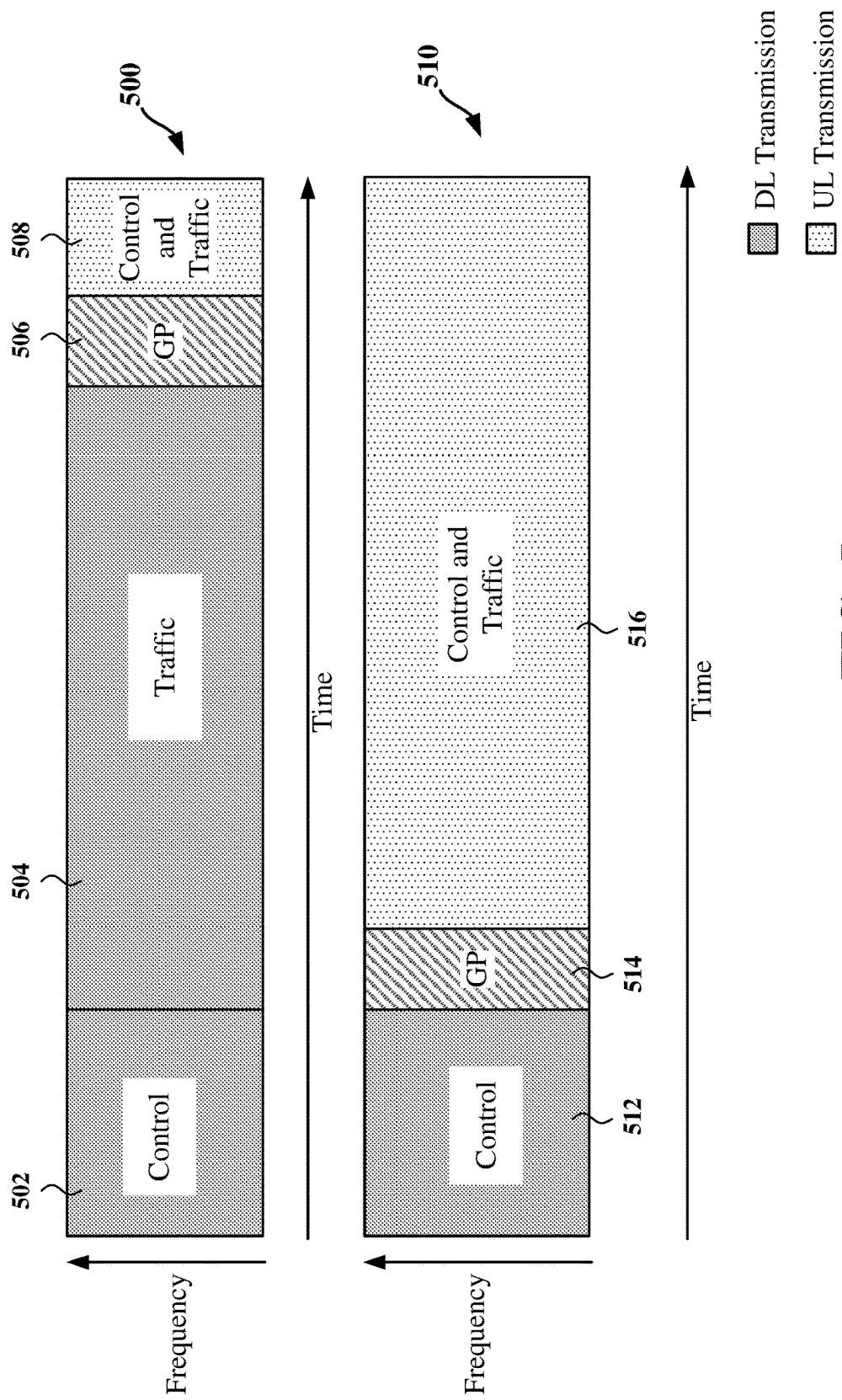
FIG. 5 is a diagram illustrating examples of slots that may be used in some networks according to some embodiments.

FIG. 5 is a diagram illustrating examples of subframes or slots 500 and 510 (hereinafter referred to as "slots") that may be used in some networks. A transmitter-scheduled slot, referred to herein as a downlink slot or DL-centric slot 500, may be used to carry control, user data traffic and/or scheduling information to a scheduled entity, which may be a UE for example. A receiver-scheduled slot, referred to herein as an uplink slot or UL-centric slot 510, may be used to receive control information from the scheduling entity, and also to transmit control information and user data traffic to a scheduling entity.

Each slot is a time division duplexed slot that includes time-frequency resources divided into transmit and receive portions in the time domain. For example, each slot may contain a plurality of consecutive subcarriers in the frequency domain and a plurality of OFDM symbols in the time domain. The number of subcarriers may be determined, for example, by the system bandwidth supported by the network or a device bandwidth supported by a particular scheduled entity. The number of OFDM symbols within each slot may be determined, for example, based on the system requirements in the network and/or the particular slot structure utilized for a current slot.

In the DL-centric slot 500, the scheduling entity first has an opportunity to transmit control information in the DL control information portion 502, and then an opportunity to transmit user data traffic in the DL traffic portion 504. Following a guard period (GP) portion 506, the scheduling entity has an opportunity to receive control information, such as acknowledged (ACK)/not acknowledged (NACK) signals, in an UL control and traffic portion 508 from scheduled entities using the carrier. This frame structure is downlink-centric, as more resources are allocated for transmissions in the downlink direction (e.g., transmissions from the scheduling entity).

In one example, the control information portion 502 may be used to transmit a physical downlink control channel (PDCCH) and the DL traffic portion 504 may be used to transmit a data payload (e.g., a physical downlink shared channel (PDSCH)). Following the GP portion 506, the scheduling entity may receive an ACK signal (or a NACK signal) from the scheduled entity during the UL control and traffic portion 508 to indicate whether the data payload was successfully received. The GP portion 506 may be scheduled to accommodate variability in UL and DL timing. For example, latencies due to RF antenna direction switching (e.g., from DL to UL) and transmission path latencies may cause the scheduled entity to transmit early on the UL to match DL timing. Such early transmission may interfere with symbols received from the scheduling entity. Accordingly, the GP portion 506 may allow an amount of time after the DL traffic portion 504 to prevent interference, where the GP portion 506 may provide an appropriate amount of time for the scheduling entity to switch its RF antenna direction, for the over-the-air (OTA) transmission time, and time for ACK processing by the scheduled entity. Accordingly, the GP portion 506 may provide an appropriate amount of time for the scheduled entity to switch its RF antenna direction (e.g., from DL to UL), to processes the user data payload, and for the over-the-air (OTA) transmission time. The duration of the GP portion 506 may be configured in terms of symbol periods. For example, the GP portion 506 may have a duration of one symbol period (e.g., 31.25 μs). This frame structure is downlink-centric, as more resources are allocated for transmissions in the downlink direction (e.g., transmissions from the scheduling entity).

In the UL-centric slot 510, the scheduled entity first has an opportunity to receive control information from the scheduling entity in the DL control information portion 512. Following a GP portion 514, the scheduled entity has an opportunity to transmit control information and/or user data traffic in an UL control and traffic portion 516. This frame structure is uplink-centric, as more resources are allocated for transmissions in the uplink direction (e.g., transmissions from the scheduled entity).

The UL control and traffic portions 508 and 516 in both the DL-centric and UL-centric slots 500 and 510 each may each include a different number of OFDM symbols N for transmitting the UL control and data information. For example, the UL control and traffic portion 508 in the DL-centric slot 500 may provide 1 symbol for transmitting UL control information and user data traffic, while the UL control and traffic portion 516 in the UL-centric slot 510 may provide 12 symbols for transmitting UL control and user data traffic information. Thus, to enable more than one symbol to be utilized in UL-centric slots 510 for UL control information, separate VCG sets may be defined for each type of slot structure (DL-centric and UL-centric) for each device bandwidth supported by the scheduled entities served by the scheduling entity. In addition, two or more VCG sets may be defined for the UL-centric slot structure for each device bandwidth to enable different numbers of symbols or different symbols in time to be utilized for UL control information.

In some examples, not all of the symbols available within the UL control and traffic portion 516 in the UL-centric slot 510 may be used for UL control information. Instead, only a portion of the symbols may be used for UL control information. In addition, the symbols utilized for UL control information may be consecutive or non-consecutive within the UL-centric slot 510. Furthermore, a VCG for an UL control channel may span over multiple slots (DL-centric and/or UL-centric), which may be consecutive or non-consecutive. For example, a VCG may be defined that includes two symbols, one in the UL control and traffic portion 508 of the DL-centric slot 500 and one in the UL control and traffic portion 516 of the UL-centric slot 510.

Figure 6:
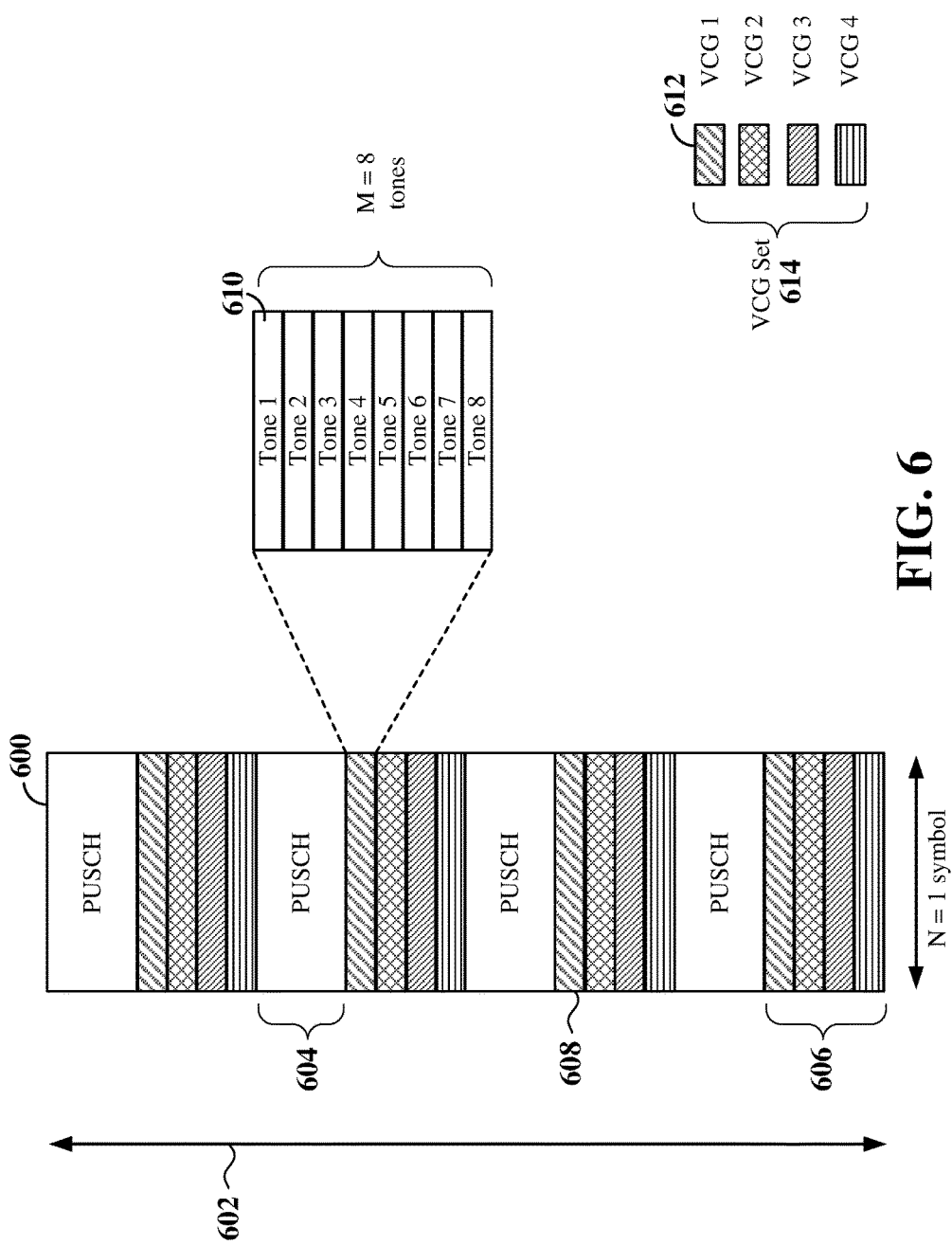
FIG. 6 is a diagram illustrating an example of a virtual cluster group set including multiple virtual cluster groups for an uplink control channel according to some embodiments.

FIG. 6 is a diagram illustrating an example of a virtual cluster group set including multiple virtual cluster groups for an uplink control channel. In FIG. 6, uplink frequency resources 600 within an available bandwidth 602 (e.g., a device bandwidth or a system bandwidth) are partitioned into traffic sections 604 and control sections 606. A scheduled entity may be assigned resources in one or more of the traffic sections 604 to transmit user data traffic to the scheduling entity. For example, the scheduled entity may transmit user data traffic on a physical uplink shared channel (PUSCH) on the assigned resources in the traffic section 604. A scheduled entity may further be assigned resources in one or more of the control sections 606 to transmit control information to the scheduling entity using virtual cluster groups (VCGs), as described below. For example, the scheduled entity may transmit control information in a physical uplink control channel (PUCCH) on the assigned VCG resources in the control sections 606.

As shown in FIG. 6, within each of the control sections 606, one or more uplink (PUCCH) clusters 608 may be defined. Each uplink cluster 608 includes one or more adjacent tones/frequencies. In general, one uplink cluster 608 may be defined by M tones in frequency and N symbols in time. In the example shown in FIG. 6, M=8 and N=1, such that each uplink cluster 608 includes eight tones 610 (Tone 1 . . . Tone 8), each having one symbol. Each tone 610 may be either a pilot tone (e.g., Demodulation Reference Signal (DMRS) tones) or an uplink control channel payload tone (e.g., ACK/NACK tones and/or Discontinuous Transmission (DTX) tones). In some examples, the tones may alternate between pilot tones and uplink control channel payload tones. For example, Tone 1 may be an uplink control channel payload tone, while Tone 2 may be a pilot tone, and so on. In other examples, all of the tones may be uplink control channel payload tones. The number of pilot and uplink control channel payload tones within an uplink cluster is configurable and not limited to any particular pattern or configuration. In addition, the pilot/control payload tone pattern or configuration may vary across uplink clusters 608.

The uplink clusters 608 may then be assigned/mapped to virtual cluster groups (VCGs) 612 (VCG 1, VCG 2, VCG 3, and VCG 4). Each VCG 612 is a set of K uplink clusters. In the example shown in FIG. 6, K=4, and one uplink cluster 608 from each of the control sections 606 is mapped to each VCG 612. In other examples, each VCG 612 may include more than one uplink cluster 608 from the same control section 606 and/or may not include any uplink clusters 608 from one or more control sections 606. The resulting VCGs 612 form a VCG set 614 for the available bandwidth 602. In general, a VCG set is a set of L VCGs defined for a bandwidth. In the example shown in FIG. 6, L=4.

Figure 7:
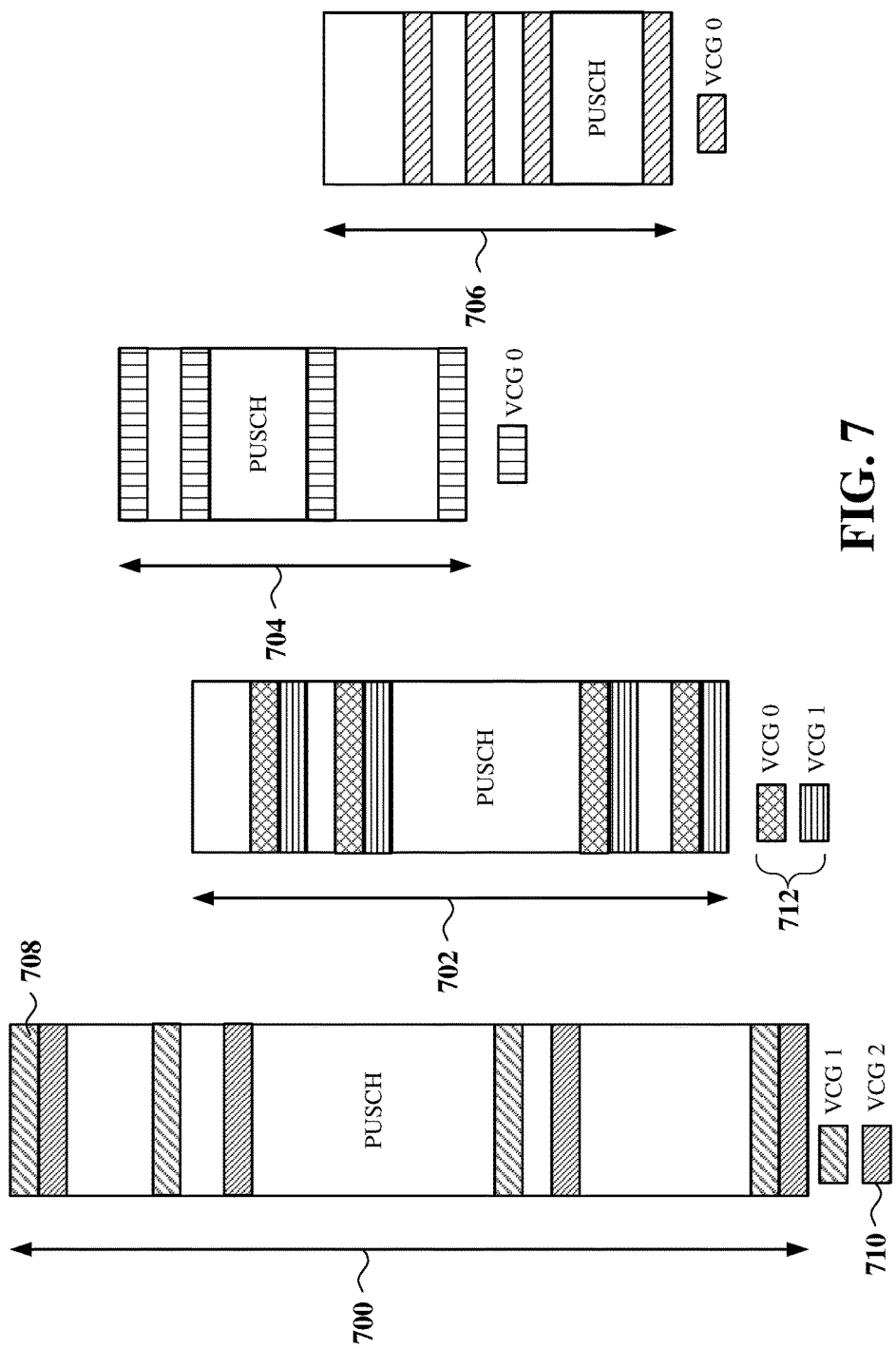
FIG. 7 is a diagram illustrating an example of mapping virtual cluster groups to physical tone locations for different bandwidths according to some embodiments.

FIG. 7 is a diagram illustrating an example of mapping virtual cluster groups to physical tone locations for different bandwidths. In the example shown in FIG. 7, four different device bandwidths are illustrated, including a system bandwidth 700 corresponding to 160 MHz, an 80 MHz bandwidth 702, and two 40 MHz bandwidths 704 and 706. Each of the 40 MHz bandwidths 704 and 706 includes a different frequency range (e.g., the frequencies within each of the 40 MHz bandwidths are different). Within each device bandwidth 700-706, uplink clusters 708 are defined and mapped to VCGs 710. For example, within the system (160 MHz) bandwidth 700, two VCGs (VCG 1 and VCG 2) are defined, within the 80 MHz bandwidth 702, two VCGs are defined (VCG 0 and VCG 1), within the first 40 MHz bandwidth 704, one VCG (VCG 0) is defined and within the second 40 MHz bandwidth 706, one VCG (VCG 0) is defined. Each VCG is identified by a respective VCG index. For example, within the system bandwidth 700, the VCG indexes are illustrated as VCG 1 and VCG 2.

The VCGs 710 within a particular device bandwidth form a VCG set 712. If only one VCG set is defined for a particular device bandwidth (e.g., the 160 MHz and 80 MHz bandwidths), a VCG identifier may not be needed for the scheduled entity to determine the VCG assigned to the scheduled entity. However, if multiple VCG sets are defined for a particular device bandwidth (e.g., the two 40 MHz VCG sets), a VCG identifier may be needed for the scheduled entity to determine the VCG assigned to thereto. For example, the VCG set 712 for device bandwidth 704 may have a VCG identifier of 1, while the VCG set 712 for device bandwidth 706 may have a VCG identifier of 2.

As shown in FIG. 7, to prevent collisions between VCG sets 712, the physical tones locations of uplink clusters 708 do not overlap between the device bandwidths 700-706. For example, the tones allocated to uplink clusters 708 within the system bandwidth 700 do not overlap with any of the tones allocated to uplink clusters within the 80 MHz bandwidth 702 or any of the 40 MHz bandwidths 704 and 706.

Figure 8:
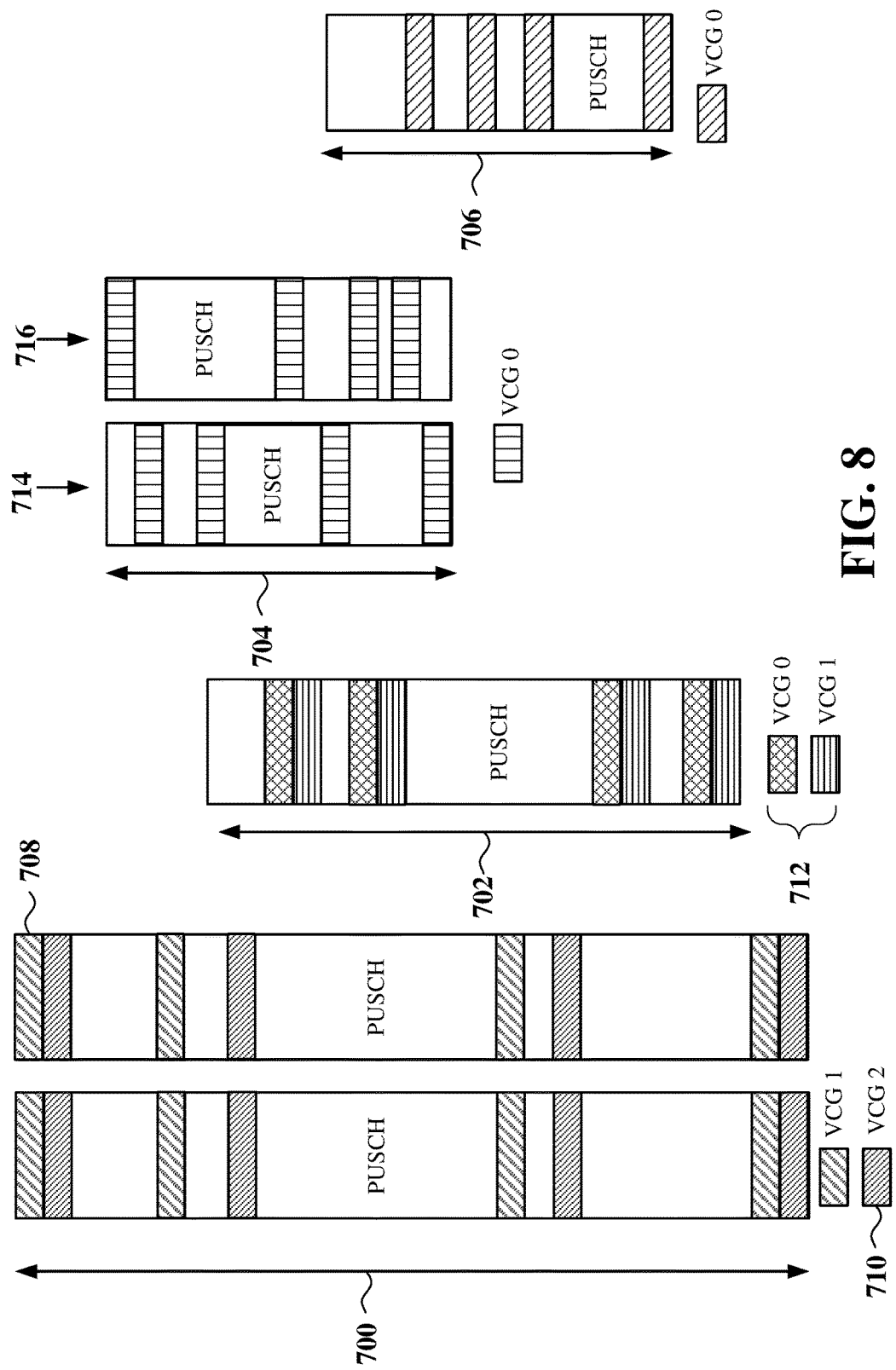
FIG. 8 is a diagram illustrating an example of mapping virtual cluster groups to physical tone locations over multiple symbols according to some embodiments.

FIG. 8 is a diagram illustrating an example of mapping virtual cluster groups to physical tone locations over multiple symbols. Different VCG sets 712 may have different numbers of symbols in the time domain (e.g., in the horizontal direction in FIG. 8). In the example shown in FIG. 8, the VCG sets 712 corresponding to device bandwidths 700 and 704 include two symbols 714 and 716, while the other device bandwidths 702 and 706 include only one symbol. For the device bandwidths 700 and 704 including more than one symbol, the symbols may be consecutive or non-consecutive within a slot or may be distributed across two or more consecutive or non-consecutive slots.

In addition, within one VCG, the mapped physical tone locations for uplink clusters may be either the same or different on different symbols. In the example shown in FIG. 8, within the VCG set 712 corresponding to the system bandwidth 700, the mapped physical tone locations for uplink clusters 708 are the same between the symbols. However, within the VCG set 712 corresponding to the first 40 MHz device bandwidth 704, the mapped physical tone locations for uplink clusters 708 differ between the symbols 714 and 716. Although in FIG. 8, the physical tone locations for the uplink clusters 708 in the second symbol 716 of device bandwidth 704 overlap with the tones allocated to uplink clusters in some other device bandwidths 702 and 706 that do not include a second symbol 716; in other examples, the physical tone locations for the uplink clusters 708 in the second symbol 716 of device bandwidth 704 may not overlap with the tones allocated to uplink clusters in any of the device bandwidths 700, 702 and 706, including those that do not include a second symbol.

Figure 9:
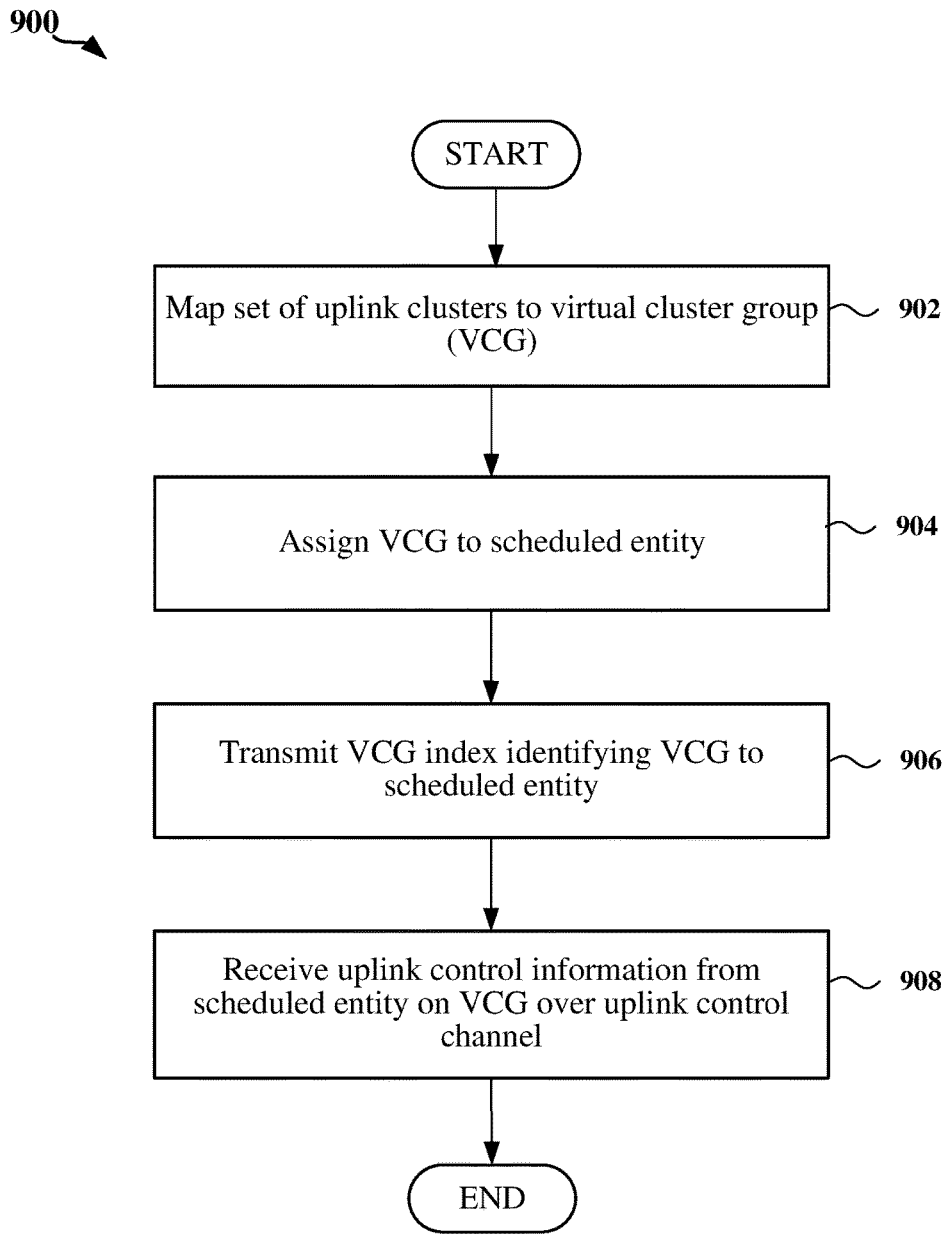
FIG. 9 is a flow chart of a method for utilizing virtual cluster groups on an uplink control channel in a wireless network according to some embodiments.

FIG. 9 is a flow chart illustrating an exemplary process 900 for utilizing virtual cluster groups (VCGs) on an uplink control channel in a wireless network in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduling entity 300 illustrated in FIG. 3. In some examples, the process 900 may be carried out by any suitable apparatus or means for carrying out the functions or algorithm described below.

At block 902, the scheduling entity may map a first set of uplink clusters to a first virtual cluster group (VCG) for the uplink control channel. Each uplink cluster may include one or more adjacent tones of a plurality of tones available for an UL control channel. For example, the VCG mapping circuitry 344 shown and described above in reference to FIG. 3 may define the uplink clusters and map the uplink clusters to the first VCG.

At block 904, the scheduling entity may assign the first VCG to a first scheduled entity of a set of one or more scheduled entities in communication with the scheduling entity for use by the scheduled entity in transmitting uplink control information to the scheduling entity. For example, the VCG assignment circuitry 345 shown and described above in reference to FIG. 3 may assign the first VCG to the first scheduled entity. At block 906, the scheduling entity may transmit a first VCG index identifying the first VCG to the first scheduled entity. For example, the DL traffic and control channel generation and transmission circuitry 342 may transmit the first VCG index to the first scheduled entity over a DL control channel.

At block 908, the scheduling entity may receive uplink control information from the first scheduled entity on the first VCG over the uplink control channel. For example, the UL traffic and control channel reception and processing circuitry 343 may receive the uplink control information from the first scheduled entity on the tones mapped to the first VCG for one or more symbols.

Figure 10:
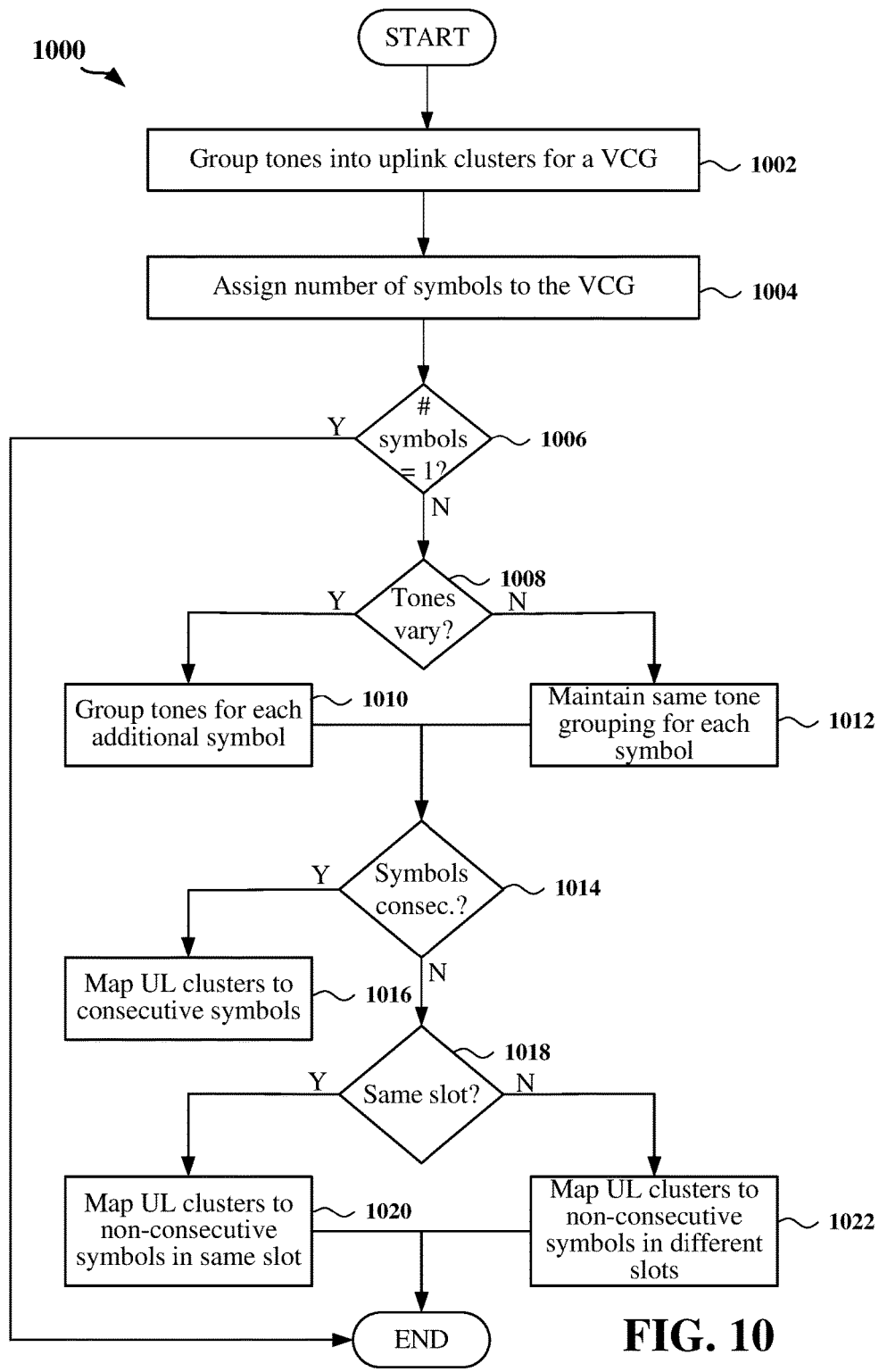
FIG. 10 is a flow chart of a method for mapping uplink clusters to a virtual cluster group according to some embodiments.

FIG. 10 is a flow chart illustrating an exemplary process 1000 for mapping uplink clusters to a virtual cluster group in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 300 illustrated in FIG. 3. In some examples, the process 1000 may be carried out by any suitable apparatus or means for carrying out the functions or algorithm described below.

At block 1002, the scheduling entity may group tones into uplink clusters for a virtual cluster group (VCG). Each uplink cluster may include, for example, one or more adjacent tones (frequencies) within a system or other device bandwidth. In addition, the uplink clusters may be within different parts of the spectrum, such that the uplink clusters for the VCG are not adjacent in frequency. For example, the VCG mapping circuitry 344 shown and described above in reference to FIG. 3 may group adjacent tones into uplink clusters.

At block 1004, the scheduling entity may assign a number of symbols to the VCG. If the number of symbols assigned to the VCG is one (Y branch of block 1006), the process may end. However, if the number of symbols assigned to the VCG is greater than one (N branch of block 1006), at block 1008, the scheduling entity may determine whether the tones in one or more of the uplink clusters of the VCG may vary between symbols. If the tones of one or more of the uplink clusters may vary between symbols (Y branch of block 1008), at block 1010, the scheduling entity may group tones into uplink clusters for each additional symbol. For example, each symbol may contain the same number of uplink clusters, each having the same number of adjacent tones/frequencies. However, the particular tones/frequencies within each uplink cluster may differ between the first symbol and one or more additional symbols. For example, in the first symbol, a first uplink cluster may include tones 0-4, while in the second symbol, the first uplink cluster may include tones 2-6. However, if the tones of one or more of the uplink clusters may not vary between symbols (N branch of 1008), at block 1012, the scheduling entity may maintain the same tone grouping for each uplink cluster in each symbol. For example, the VCG mapping circuitry 344 shown and described above in connection with FIG. 3 may assign a number of symbols to the VCG and group tones into the uplink clusters for each symbol.

At block 1014, the scheduling entity may determine whether the symbols in the VCG are consecutive. If the symbols in the VCG are consecutive (Y branch of 1014), at block 1016, the scheduling entity may map the uplink clusters of the VCG to consecutive symbols. However, if the symbols in the VCG are not consecutive (N branch of 1014), at block 1018, the scheduling entity may determine whether the symbols are within the same slot. If the symbols are within the same slot (Y branch of 1018), at block 1020, the scheduling entity may map the uplink clusters of the VCG to non-consecutive symbols in the same slot. However, if at least some of the symbols are not within the same slot (N branch of 1018), the scheduling entity may map the uplink clusters of the VCG to non-consecutive symbols in different slots at block 1022. For example, the VCG mapping circuitry 344 shown and described above in connection with FIG. 3 may map the uplink clusters of the VCG to consecutive or non-consecutive symbols in the same slot or different slots.

Figure 11:
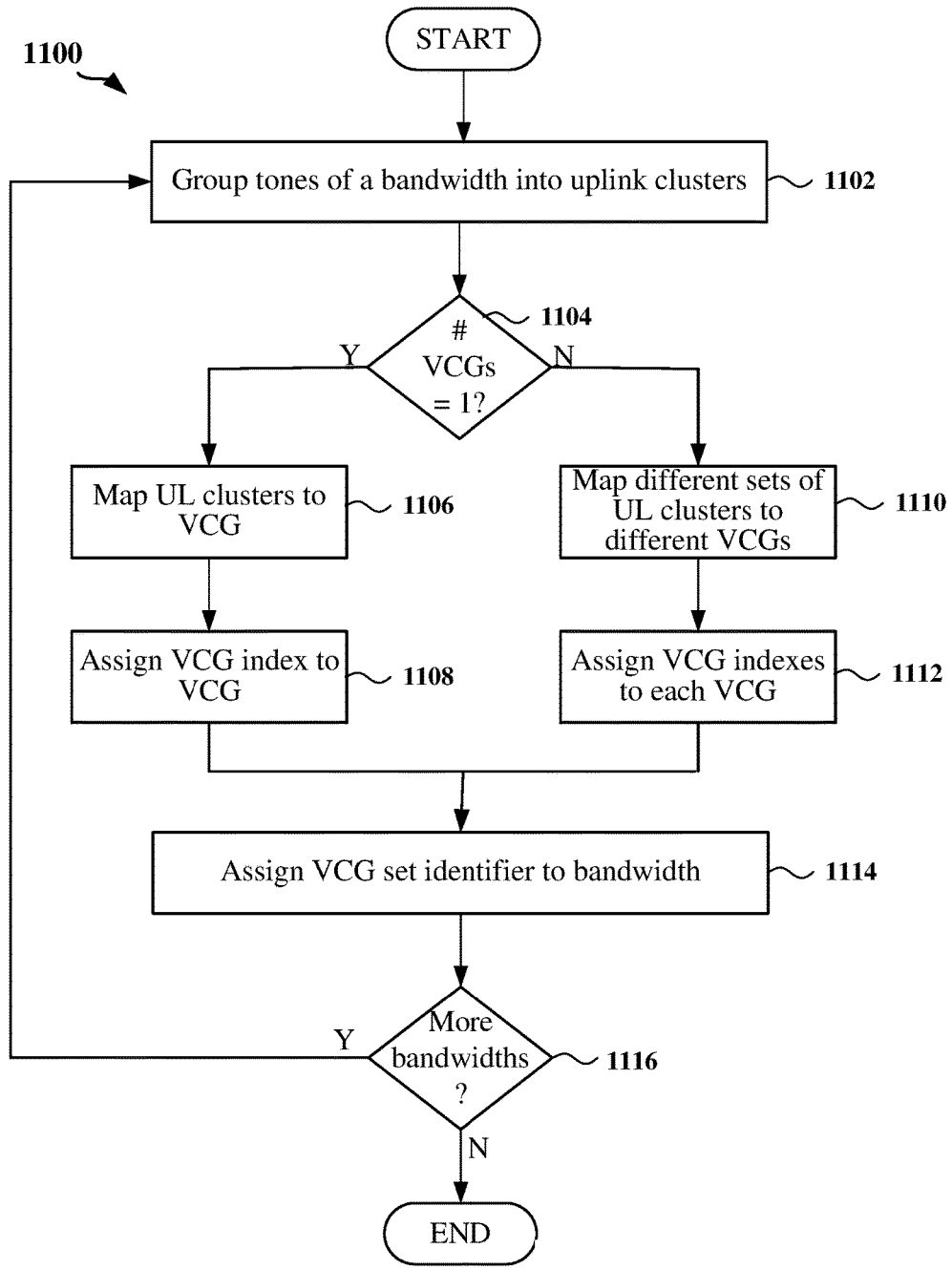
FIG. 11 is a flow chart of a method for mapping uplink clusters to virtual cluster groups within one or more bandwidths according to some embodiments.

FIG. 11 is a flow chart illustrating an exemplary process 1100 for mapping uplink clusters to virtual cluster groups within one or more bandwidths in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 300 illustrated in FIG. 3. In some examples, the process 1100 may be carried out by any suitable apparatus or means for carrying out the functions or algorithm described below.

At block 1102, the scheduling entity may group tones of a particular bandwidth (e.g., a system bandwidth or a device bandwidth) into uplink clusters. Each uplink cluster may include, for example, one or more adjacent tones (frequencies) within the bandwidth in the frequency domain and one or more symbols in the time domain. In addition, the tones within each uplink cluster may vary between symbols and the symbols may be consecutive or non-consecutive over one or more slots. For example, the VCG mapping circuitry 344 shown and described above in reference to FIG. 3 may group adjacent tones into uplink clusters.

At block 1104, the scheduling entity may determine whether the number of VCGs within the bandwidth is equal to one. If there is a single VCG for the bandwidth (Y branch of 1104), at block 1106, the scheduling entity may map the uplink clusters to the single VCG, and at block 1108, assign a VCG index to the VCG. However, if there is more than one VCG for the bandwidth (N branch of 1104), at block 1110, the scheduling entity may map different sets of uplink clusters to different VCGs, and at block 1112, assign a respective VCG index to each VCG. In some examples, each VCG includes the same number of uplink clusters. In other examples, the number of uplink clusters assigned to each VCG may differ. However, within a VCG, each uplink cluster may include the same number of adjacent tones and the same number of symbols. In addition, the uplink clusters of a VCG may be within different parts of the spectrum, such that the uplink clusters of a VCG are not adjacent in frequency. For example, the VCG mapping circuitry 344 shown and described above in reference to FIG. 3 may map uplink clusters to VCGs.

At block 1114, the scheduling entity may assign a VCG set identifier to the bandwidth to identify the set of VCGs within the particular bandwidth. For example, the VCG mapping circuitry 344 shown and described above in connection with FIG. 3 may assign the VCG set identifier to the bandwidth. At block 1116, the scheduling entity may determine whether more bandwidths exist for which VCGs should be defined. If there are additional bandwidths (Y branch of 1116), the scheduling entity repeats the process 1100 beginning at block 1102. In some examples, there is no tone overlap between the uplink clusters defined in each VCG set (e.g., for each bandwidth). In other examples, tone overlap may occur between different symbols in different VCG sets. However, if there are no additional bandwidths for which VCGs should be defined (N branch of 1116), the process ends. For example, the VCG mapping circuitry 344 shown and described above in connection with FIG. 3 may repeat the process 1100 for each bandwidth supported by the scheduling entity.

Figure 12:
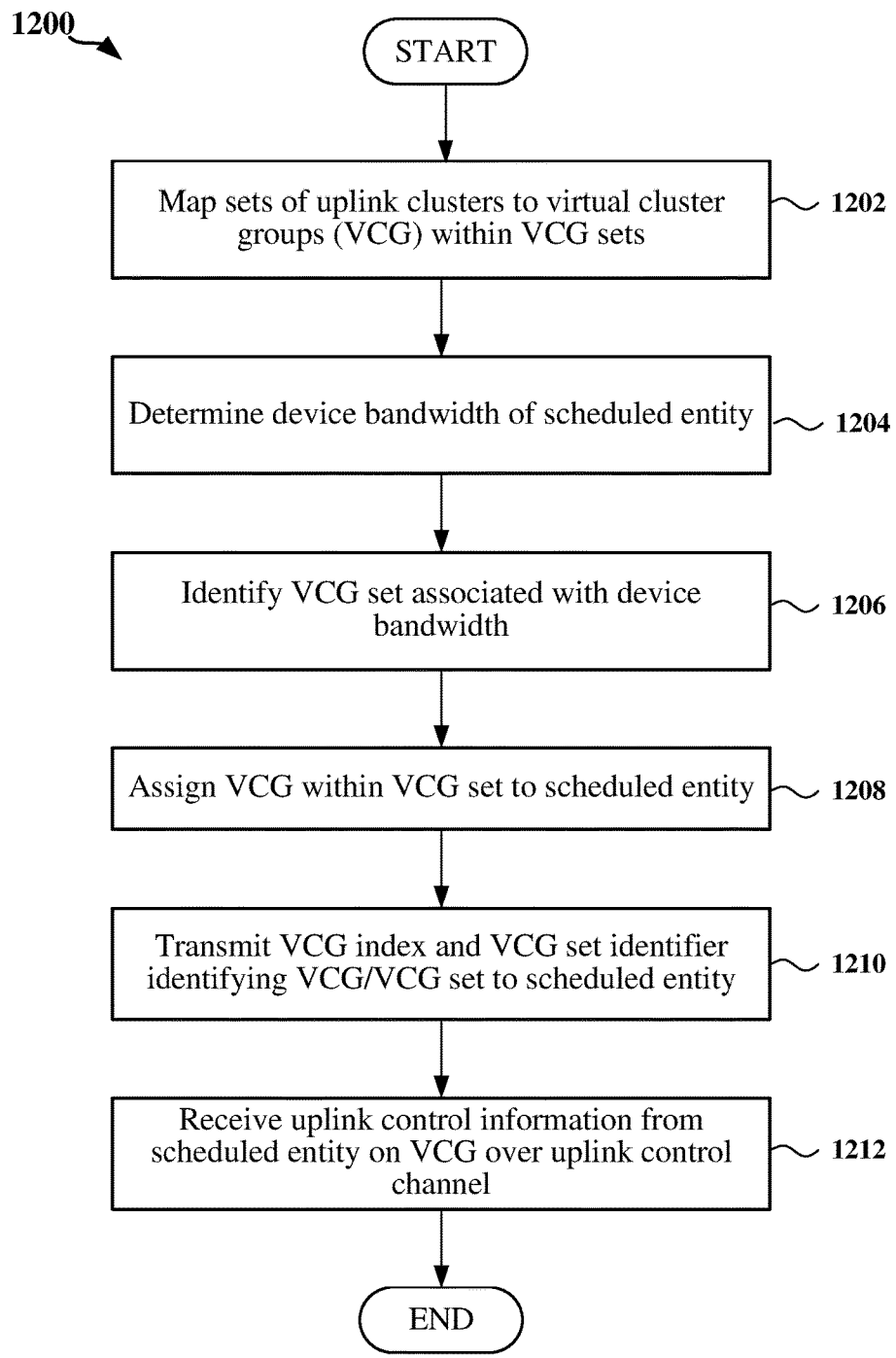
FIG. 12 is a flow chart of another method for utilizing virtual cluster groups on an uplink control channel in a wireless network according to some embodiments.

FIG. 12 is a flow chart illustrating an exemplary process 1200 for utilizing virtual cluster groups on an uplink control channel in a wireless network in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 300 illustrated in FIG. 3. In some examples, the process 1200 may be carried out by any suitable apparatus or means for carrying out the functions or algorithm described below.

At block 1202, the scheduling entity may map respective sets of uplink clusters to respective VCGs, where each VCG is included within a VCG set for a particular bandwidth utilized for the uplink control channel. Each uplink cluster may include, for example, one or more adjacent tones (frequencies) within a particular bandwidth in the frequency domain and one or more symbols in the time domain. In addition, the tones within each uplink cluster may vary between symbols and the symbols may be consecutive or non-consecutive over one or more slots. For example, the VCG mapping circuitry 344 shown and described above in reference to FIG. 3 may define the uplink clusters and map the uplink clusters to VCGs.

At block 1204, the scheduling entity may determine a device bandwidth supported by a scheduled entity, and at block 1206, identify the VCG set associated with the device bandwidth. At block 1208, the scheduling entity may select a VCG within the VCG set corresponding to the scheduled entity device bandwidth and assign the selected VCG to the scheduled entity for use by the scheduled entity in transmitting uplink control information to the scheduling entity. For example, the VCG assignment circuitry 345 shown and described above in reference to FIG. 3 may assign the VCG to the scheduled entity.

At block 1210, the scheduling entity may transmit a VCG index identifying the VCG and a VCG set identifier identifying the VCG set to the scheduled entity. For example, the DL traffic and control channel generation and transmission circuitry 342 may transmit the VCG index and VCG set identifier to the scheduled entity over a DL control channel. At block 1212, the scheduling entity may receive uplink control information from the scheduled entity on the VCG over the uplink control channel. For example, the UL traffic and control channel reception and processing circuitry 343 may receive the uplink control information from the scheduled entity on the tones/symbols mapped to the VCG.

Figure 13:
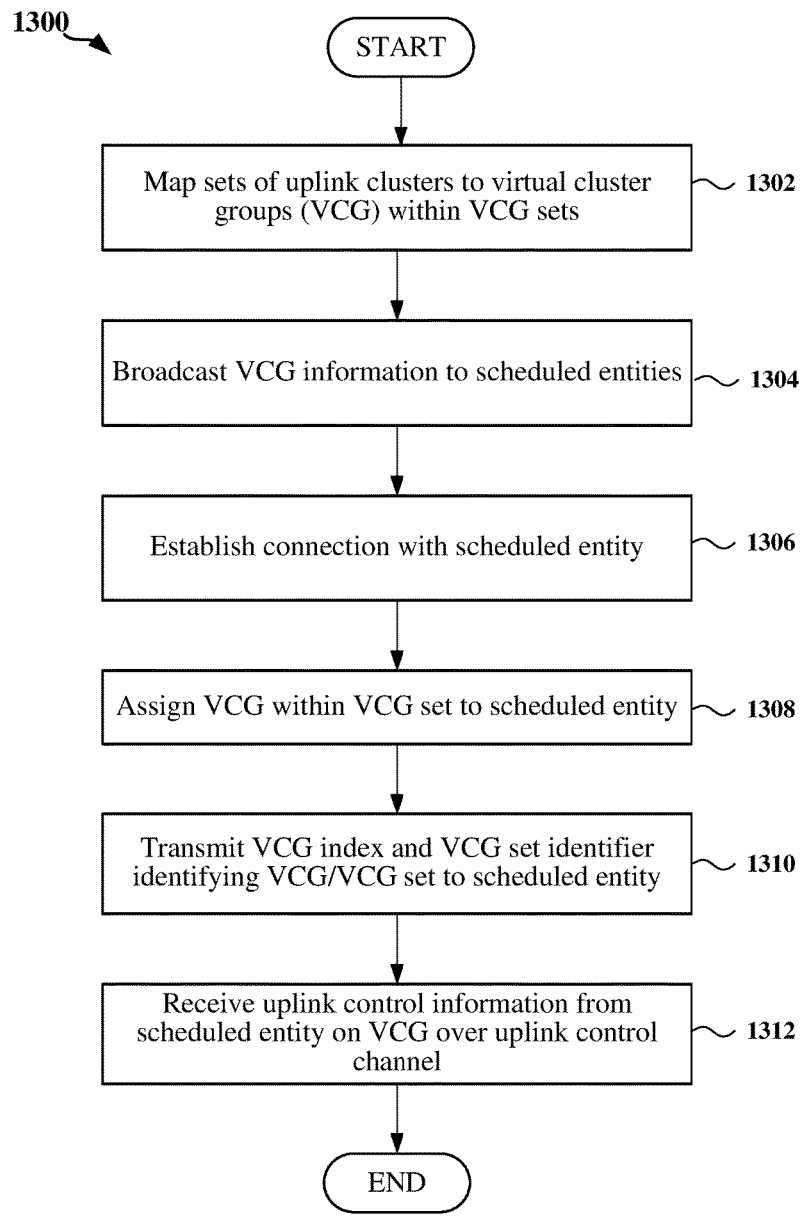
FIG. 13 is a flow chart of another method for utilizing virtual cluster groups on an uplink control channel in a wireless network according to some embodiments.

FIG. 13 is a flow chart illustrating an exemplary process 1300 for utilizing virtual cluster groups on an uplink control channel in a wireless network in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 300 illustrated in FIG. 3. In some examples, the process 1300 may be carried out by any suitable apparatus or means for carrying out the functions or algorithm described below.

At block 1302, the scheduling entity may map respective sets of uplink clusters to respective VCGs, where each VCG is included within a VCG set for a particular bandwidth utilized for the uplink control channel. Each uplink cluster may include, for example, one or more adjacent tones (frequencies) within a particular bandwidth in the frequency domain and one or more symbols in the time domain. In addition, the tones within each uplink cluster may vary between symbols and the symbols may be consecutive or non-consecutive over one or more slots. For example, the VCG mapping circuitry 344 shown and described above in reference to FIG. 3 may define the uplink clusters and map the uplink clusters to VCGs.

At block 1304, the scheduling entity may broadcast VCG information to the scheduled entities. The VCG information may include, for example, VCG set identifiers, VCG indexes under each VCG set identifier, and time-frequency resources associated with each VCG (e.g., tones and symbols mapped to each uplink cluster of a VCG). The scheduling entity may broadcast the VCG information within, for example, one or more Session Information Blocks (SIBs). For example, the DL traffic and control channel generation and transmission circuitry 342 shown and described above in reference to FIG. 3 may broadcast the VCG information.

At block 1306, the scheduling entity may establish a connection with a scheduled entity. In some examples, the scheduling entity may receive a random access message and/or RRC connection request message from the scheduled entity and process the random access message and/or RRC message to establish a connection with the scheduled entity. For example, the UL traffic and control channel reception and processing circuitry 343 may establish the connection with the scheduled entity.

At block 1308, the scheduling entity may select a VCG within the VCG set corresponding to the scheduled entity device bandwidth and assign the selected VCG to the scheduled entity for use by the scheduled entity in transmitting uplink control information to the scheduling entity.

For example, the VCG assignment circuitry 345 shown and described above in reference to FIG. 3 may assign the VCG to the scheduled entity.

At block 1310, the scheduling entity may transmit a VCG index identifying the VCG and a VCG set identifier identifying the VCG set to the scheduled entity. For example, the DL traffic and control channel generation and transmission circuitry 342 may transmit the VCG index and VCG set identifier to the scheduled entity over a DL control channel. At block 1312, the scheduling entity may receive uplink control information from the scheduled entity on the VCG over the uplink control channel. For example, the UL traffic and control channel reception and processing circuitry 343 may receive the uplink control information from the scheduled entity on the tones/symbols mapped to the VCG.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity in a wireless communication network, the method comprising:

communicating between the scheduling entity and a set of one or more scheduled entities in the wireless communication network, wherein uplink transmissions originate at a scheduled entity of the set of one or more scheduled entities and downlink transmissions originate at the scheduling entity;

mapping a first set of uplink clusters of a plurality of uplink clusters to a first virtual cluster group (VCG) for an uplink control channel, each of the plurality of uplink clusters comprising one or more respective adjacent tones of a plurality of tones and one or more symbols;

assigning a number of symbols to each of the uplink clusters, wherein the number of symbols in each uplink cluster within the first set of uplink clusters is identical;

assigning the first VCG to a first scheduled entity of the set of one or more scheduled entities for use in transmitting uplink control information;

transmitting a first VCG index identifying the first VCG to the first scheduled entity; and receiving the uplink control information from the first scheduled entity on the first VCG over the uplink control channel.

2. The method of claim 1, wherein the number of symbols in each uplink cluster within the first set of uplink clusters is one.

3. The method of claim 1, wherein the number symbols in each uplink cluster within the first set of uplink clusters is greater than one.

4. The method of claim 3, wherein the adjacent tones included in at least one uplink cluster of the first set of uplink clusters varies between each symbol in the number of symbols.

5. The method of claim 1, wherein the symbols are non-consecutive in time across one or more slots.

6. The method of claim 5, wherein the one or more slots are consecutive or non-consecutive in time.

7. The method of claim 1, wherein mapping the first set of uplink clusters of the plurality of uplink clusters to the first VCG for the uplink control channel further comprises:
mapping the first set of uplink clusters across a first bandwidth to the first VCG, the first bandwidth corresponding to a first device bandwidth supported by the first scheduled entity.

8. The method of claim 7, further comprising:
mapping a second set of uplink clusters across the first bandwidth to a second VCG for the uplink control channel, wherein the second VCG is identified by a second VCG index, wherein the adjacent tones within the first set of uplink clusters and the second set of uplink clusters are non-overlapping;
assigning the second set of uplink clusters to a second scheduled entity of the set of one or more scheduled entities; and
transmitting the second VCG index of the second VCG to the second scheduled entity;
wherein the first VCG and the second VCG are included within a first VCG set associated with the first bandwidth.

9. The method of claim 8, further comprising:
mapping a third set of uplink clusters across a second bandwidth to a third VCG for the uplink control channel, wherein the third VCG is identified by a third VCG index;
assigning the third set of uplink clusters to a third scheduled entity of the set of one or more scheduled entities, wherein the second bandwidth corresponds to a second device bandwidth supported by the third scheduled entity, wherein the first bandwidth is different than the second bandwidth; and
transmitting the third VCG index of the third VCG to the third scheduled entity;
wherein the third VCG is included within a second VCG set associated with the second bandwidth.

10. The method of claim 9, wherein the adjacent tones within the first set of uplink clusters, the second set of uplink clusters and the third set of uplink clusters are non-overlapping.

11. The method of claim 9, wherein the first set of uplink clusters is further mapped to a first symbol in the time domain and wherein mapping the third set of uplink clusters further comprises:
mapping the third set of uplink clusters to a second symbol in the time domain.

12. The method of claim 11, wherein the adjacent tones within the first set of uplink clusters at least partially overlap with the adjacent tones within the third set of uplink clusters.

13. The method of claim 1, wherein each tone of the plurality of tones is included within only one of the uplink clusters.

14. The method of claim 1, wherein the uplink clusters of the first set of uplink clusters are non-adjacent in frequency.

15. The method of claim 1, wherein each uplink cluster within the first set of uplink clusters comprises pilot tones and uplink control channel tones.

16. The method of claim 1, wherein each uplink cluster within the first set of uplink clusters comprises only uplink control channel tones.

17. The method of claim 1, wherein the uplink control information from the first scheduled entity is located on the adjacent tones within the first VCG within each symbol assigned to the first VCG.

18. The method of claim 1, further comprising:
establishing a connection with the first scheduled entity;
wherein mapping the first set of uplink clusters to the first VCG occurs prior to establishing the connection with the first scheduled entity; and
wherein assigning the first VCG to the first scheduled entity occurs after establishing the connection with the first scheduled entity.

19. A scheduling entity in a wireless communication network, comprising:
a transceiver for wireless communication with a scheduled entity, wherein uplink transmissions originate at the scheduled entity and downlink transmissions originate at the scheduling entity;
a memory; and
a processor communicatively coupled to the transceiver and the memory, the processor configured to:
map a first set of uplink clusters of a plurality of uplink clusters to a first virtual cluster group (VCG) for an uplink control channel, each of the plurality of uplink clusters including one or more respective adjacent tones of a plurality of tones;
assign a number of symbols to each of the uplink clusters, wherein the number of symbols in each uplink cluster within the first set of uplink clusters is identical;
assign the first VCG to a first scheduled entity of the set of one or more scheduled entities for use in transmitting uplink control information;
transmit a first VCG index identifying the first VCG to the first scheduled entity; and
receive the uplink control information from the first scheduled entity on the first VCG over the uplink control channel.

20. The scheduling entity of claim 19, wherein the adjacent tones included in at least one uplink cluster of the first set of uplink clusters varies between each symbol in the number of symbols.

21. The scheduling entity of claim 19, wherein the symbols are non-consecutive in time across one or more slots.

22. The scheduling entity of claim 21, wherein the one or more slots are consecutive or non-consecutive in time.

23. The scheduling entity of claim 19, wherein the processor is further configured to:
map the first set of uplink clusters across a first bandwidth to the first VCG, the first bandwidth corresponding to a first device bandwidth supported by the first scheduled entity.

24. The scheduling entity of claim 23, wherein the processor is further configured to:
map a second set of uplink clusters across the first bandwidth to a second VCG for the uplink control channel, wherein the second VCG is identified by a second VCG index, wherein the adjacent tones within the first set of uplink clusters and the second set of uplink clusters are non-overlapping;
assign the second set of uplink clusters to a second scheduled entity of the set of one or more scheduled entities; and
transmit the second VCG index of the second VCG to the second scheduled entity;
wherein the first VCG and the second VCG are included within a first VCG set associated with the first bandwidth.

25. The scheduling entity of claim 24, wherein the processor is further configured to:
map a third set of uplink clusters across a second bandwidth to a third VCG for the uplink control channel, wherein the third VCG is identified by a third VCG index;
assign the third set of uplink clusters to a third scheduled entity of the set of one or more scheduled entities, wherein the second bandwidth corresponds to a second device bandwidth supported by the third scheduled entity, wherein the first bandwidth is different than the second bandwidth; and
transmit the third VCG index of the third VCG to the third scheduled entity;
wherein the third VCG is included within a second VCG set associated with the second bandwidth.

26. A scheduling entity apparatus in a wireless communication network, comprising:
means for communicating between the scheduling entity and a set of one or more scheduled entities, wherein uplink transmissions originate at a scheduled entity of the set of one or more scheduled entities and downlink transmissions originate at the scheduling entity;
means for mapping a first set of uplink clusters of a plurality of uplink clusters to a first virtual cluster group (VCG) for an uplink control channel, each of the plurality of uplink clusters including one or more respective adjacent tones of a plurality of tones;
means for assigning a number of symbols to each of the uplink clusters, wherein the number of symbols in each uplink cluster within the first set of uplink clusters is identical;
means for assigning the first VCG to a first scheduled entity of the set of one or more scheduled entities for use in transmitting uplink control information;
means for transmitting a first VCG index identifying the first VCG to the first scheduled entity; and
means for receiving the uplink control information from the first scheduled entity on the first VCG over the uplink control channel.

27. The scheduling entity apparatus of claim 26, further comprising:
means for mapping the first set of uplink clusters across a first bandwidth to the first VCG, the first bandwidth corresponding to a first device bandwidth supported by the first scheduled entity;
means for mapping a second set of uplink clusters across a second bandwidth to a second VCG for the uplink control channel, wherein the second VCG is identified by a second VCG index, wherein the adjacent tones within the first set of uplink clusters and the second set of uplink clusters are non-overlapping;
means for assigning the second set of uplink clusters to a second scheduled entity of the set of one or more scheduled entities; and
means for transmitting the second VCG index of the second VCG to the second scheduled entity;
wherein the first VCG is included within a first VCG set associated with the first bandwidth and the second VCG is included within a second VCG set associated with the second bandwidth.

28. A method of wireless communication at a scheduled entity in a wireless communication network, the method comprising:
communicating between the scheduled entity and a scheduling entity in the wireless communication network, wherein uplink transmissions originate at the scheduled entity and downlink transmissions originate at the scheduling entity;
maintaining a table mapping respective sets of uplink clusters of a plurality of uplink clusters to respective virtual cluster groups (VCGs) for an uplink control channel, each of the plurality of uplink clusters comprising one or more respective adjacent tones of a plurality of tones and one or more symbols, wherein a number of symbols in each uplink cluster within a first set of uplink clusters corresponding to a first VCG is identical;
receiving VCG information from the scheduling entity assigning the first VCG to the scheduled entity for use in transmitting uplink control information; and
transmitting the uplink control information to the scheduling entity on the first VCG over the uplink control channel.

29. The method of claim 28, wherein the VCG information comprises a VCG index identifying the first VCG, and further comprising:
indexing on the table using the VCG index to identify the one or more respective adjacent tones and the one or more symbols of each uplink cluster assigned to the first VCG.

30. The method of claim 28, wherein the number of symbols in each uplink cluster within the first set of uplink clusters is one.

31. The method of claim 28, wherein the adjacent tones included in at least one uplink cluster of the first set of uplink clusters varies between each symbol in the number of symbols.

32. The method of claim 28, wherein the symbols are non-consecutive in time across one or more slots.

33. The method of claim 32, wherein the one or more slots are consecutive or non-consecutive in time.

34. The method of claim 28, wherein the first set of uplink clusters is mapped across a device bandwidth supported by the scheduled entity.

35. The method of claim 28, wherein the uplink clusters of the first set of uplink clusters are non-adjacent in frequency.

36. The method of claim 28, wherein the uplink control information is located on the adjacent tones within the first VCG within each symbol assigned to the first VCG.

37. A scheduled entity in a wireless communication network, comprising:
a transceiver for wireless communication with a scheduling entity, wherein uplink transmissions originate at the scheduled entity and downlink transmissions originate at the scheduling entity;
a memory; and
a processor communicatively coupled to the transceiver and the memory, the processor configured to:
maintain a table mapping respective sets of uplink clusters of a plurality of uplink clusters to respective virtual cluster groups (VCGs) for an uplink control channel, each of the plurality of uplink clusters comprising one or more respective adjacent tones of a plurality of tones and one or more symbols, wherein a number of symbols in each uplink cluster within a first set of uplink clusters corresponding to a first VCG is identical;

receive VCG information from the scheduling entity assigning the first VCG to the scheduled entity for use in transmitting uplink control information via the transceiver; and transmit the uplink control information to the scheduling entity on the first VCG over the uplink control channel via the transceiver.

\* \* \* \* \*